Oct. 23, 1923.

P. N. JANSEN

1,471,734

VEHICULAR EXTENSION SUPPORT

Filed Dec. 24, 1921    10 Sheets—Sheet 2

INVENTOR.
PETER N. JANSEN.
BY
ATTORNEY

Oct. 23, 1923.

P. N. JANSEN

VEHICULAR EXTENSION SUPPORT

Filed Dec. 24, 1921    10 Sheets-Sheet 3

INVENTOR.
PETER N. JANSEN.
BY
ATTORNEY

Oct. 23, 1923.

P. N. JANSEN 1,471,734

VEHICULAR EXTENSION SUPPORT

Filed Dec. 24, 1921 10 Sheets-Sheet 5

INVENTOR.
PETER N. JANSEN.
BY
ATTORNEY

Oct. 23, 1923.    1,471,734
P. N. JANSEN
VEHICULAR EXTENSION SUPPORT
Filed Dec. 24, 1921    10 Sheets-Sheet 7

INVENTOR.
PETER N. JANSEN.
BY *Wm Ebach Jr*
ATTORNEY

Oct. 23, 1923.

P. N. JANSEN 1,471,734

VEHICULAR EXTENSION SUPPORT

Filed Dec. 24, 1921    10 Sheets-Sheet 8

INVENTOR.
PETER N. JANSEN.
BY
ATTORNEY

Oct. 23, 1923.　　　　　　　　　　　　　　　　　　1,471,734
P. N. JANSEN
VEHICULAR EXTENSION SUPPORT
Filed Dec. 24, 1921　　　10 Sheets-Sheet 9

INVENTOR.
PETER N. JANSEN.
BY
ATTORNEY

Oct. 23, 1923.

P. N. JANSEN 1,471,734

VEHICULAR EXTENSION SUPPORT

Filed Dec. 24, 1921 10 Sheets-Sheet 10

INVENTOR.
PETER N. JANSEN.
BY
ATTORNEY

Patented Oct. 23, 1923.

1,471,734

UNITED STATES PATENT OFFICE.

PETER N. JANSEN, OF PHILADELPHIA, PENNSYLVANIA.

VEHICULAR EXTENSION SUPPORT.

Application filed December 24, 1921. Serial No. 524,751.

*To all whom it may concern:*

Be it known that I, PETER N. JANSEN, a citizen of the United States, residing at Philadelphia, in the county of Philadelphia and State of Pennsylvania, have invented certain new and useful Improvements in Vehicular Extension Supports, of which the following is a specification.

My invention relates to supports and is concerned more particularly with unit structures rather than knock-down or assembled structures such as the scaffold.

A characteristic of the invention is the incorporation, in a unit organization, of a supporting base, an upright extensible supporting column, a platform, and mechanism operable from the platform to extend and retract the column. Beneath the supporting base a running gear (wheeled preferred) is provided, and with the running gear suitable propelling mechanism and suitable steering mechanism are associated. Preferably both such mechanisms are so constructed and so related to the platform that an occupant thereof can, as occasion demands, both propel and steer the device as a unit.

Assume, as an instance of utility, that the device is in use as a support for an occupant engaged in ceiling painting or decoration work. Such occupant can, while supported on the adjustable platform, raise and lower the platform at will; propel and steer the device while thus supported; and, in view of such controllability, work with a maximum of comfort, a maximum of convenience and a maximum of efficiency.

Heretofore workmen engaged in work required to be done at an inaccessible elevation have been required to work at all times while supported upon a scaffold. A scaffold structure, especially when used interiorly, is objectionable for the following reasons, to wit: First, it is costly of construction and is incapable of movement when once erected; second, it is wasteful of material and is at all times an eyesore to the observer; third, being a fixed structure, it is practically useless where the work required to be done is spread out over a large area at different elevations; fourth, when built or assembled, it is useful only for the particular work at hand and cannot, while in use, be extended or retracted; fifth, being a built up or assembled structure, it usually follows that the floor and walls of the room or hall in which it is erected are marred or defaced to such an extent as to often require repair or refinishing after the scaffold is dismantled or knocked down; and sixth, not only does it require that a substantial portion of the floor space be given over to the scaffold supports, but in addition, due to the fact that the structure is temporary only, it is often characterized by an absence of the requisite factor of safety.

As distinguished from the scaffold, a unit support, adjustable, propellable and steerable, can be used under many and varied circumstances. Being adjustable, an occupant thereof can, without assistance, follow along from one area of work to another as the work progresses, and can, without assistance, control such movement at all times; and being steerable, the movement of the device or support during propulsion, is at all times directly under the control of the occupant, and the occupant can, without assistance, direct such movement, regardless of the position of adjustment of the platform. Such a support is neither cumbersome nor unwieldy and is essentially under all service conditions both a time saving and a labor saving device. It can be used repeatedly and is capable of being transported from place to place as a unit under its own power. Its propelling power may be either manual, electric or otherwise, or, if desired, during transportation, it can be conveniently coupled up with a second vehicular device and towed. Its utility moreover is not merely that of a substitute for the scaffold, as obviously, without modification, it can be used as an extension tower in connection with any and all kinds of work required to be done at an elevation. It can be used in the repair of arc lamps and overhead trolley appliances by street lighting and traction concerns, or, if desired, can be used on board ship as an observation tower, collapsible when not in use. Other uses, of which there are many, will suggest themselves as the detail construction and operation of the device are better understood.

With reference to the drawings wherein one embodiment of the invention is disclosed and wherein like reference numerals denote like or corresponding parts throughout the several views.

In the embodiment of the invention selected for illustration a supporting column substantially square in cross section is shown. It is to be understood however that the number of sides employed in the erection of the supporting column may be varied in actual practice. Obviously the supporting column may have only three sides or the number of sides may be increased to five or more. In either or any event it is essential that the total number of column sides be appropriately connected to the end that a perfectly rigid column, strongly braced, is produced. The extent of adjustment accorded the column may also be varied by a variation in the number of links employed in its construction. For each pair of links added or subtracted the extent of adjustment is proportionately increased or diminished. For all ordinary use, not less than twenty nor more than forty pairs of links to the column side should suffice. Properly proportioned and dimensioned thirty pairs of links to the column side will enable an extension support to be built having an over-all height, when fully collapsed, of approximately six feet, and when fully extended, of approximately sixty feet; it being apparent that any intermediate adjustment between six and sixty feet can, when required, be quickly and conveniently attained.

The supporting column, designated in its entirety by the numeral 30, is mounted on a suitable supporting base or base platform 31. The supporting base, in its preferred embodiment, is constructed in the form of a vehicle, i. e., is mobile, and, as hereinafter more fully explained, is capable of being propelled and steered. The supporting wheels (of which there are four) are designated respectively as 32—32 and 33—33, the former denoting the front or steering wheels and the latter the rear or driving wheels. As illustrated, the wheels are arranged adjacent to the respective four corners of the supporting base; two wheels on either side.

The supporting base, on its under side, is re-enforced radially by angle-irons or other suitable bracing means 34, and marginally is reenforced by down-turned flanges 34'.

In line with the radial braces 34, on the opposite face however of the base, I provide a corresponding number of guide rails 35. Each guide rail includes two rail sections arranged in parallelism and slightly spaced to provide guide slots 36. The rail sections per se are constructed alike. Each along one edge is flanged inwardly as at 37 and along its opposite edge is flanged outwardly as at 38. The inwardly extending flanges 37 provide bearing surfaces for roller bearings 39 whereas the outwardly extending flanges 38 provide bearing surfaces for the attachment of the rail sections to the base platform as indicated at 40. Jointly the rails 35 guide the roller bearings 39 inwardly toward the longitudinal axis of the supporting column 30 as the column is longitudinally extended and radially outwardly or away from said axis as the supporting column is retracted or collapsed.

The sides of the supporting column include in each instance a plurality of pairs of connected intersecting links. Collectively the total number of pairs of links comprised in each column side constitute in effect "lazy tongs." The links of the lazy tong structures are designated as 41. Intermediately of their ends, the links of each pair are crossed and pivotally connected together as indicated at 42. At their ends they are pivotally connected to the next adjacent pair of links as indicated at 43. Thus connected, a variation in the angular relation of one pair of links of a lazy tong structure will simultaneously impart to the total number of links of each structure a corresponding variation. For added strength, the longitudinal edges of the links of each pair are flanged as at 44, the flanges being oppositely extended to provide perfectly smooth engaging surfaces at the point or points of intersection of the links.

Figure 3:
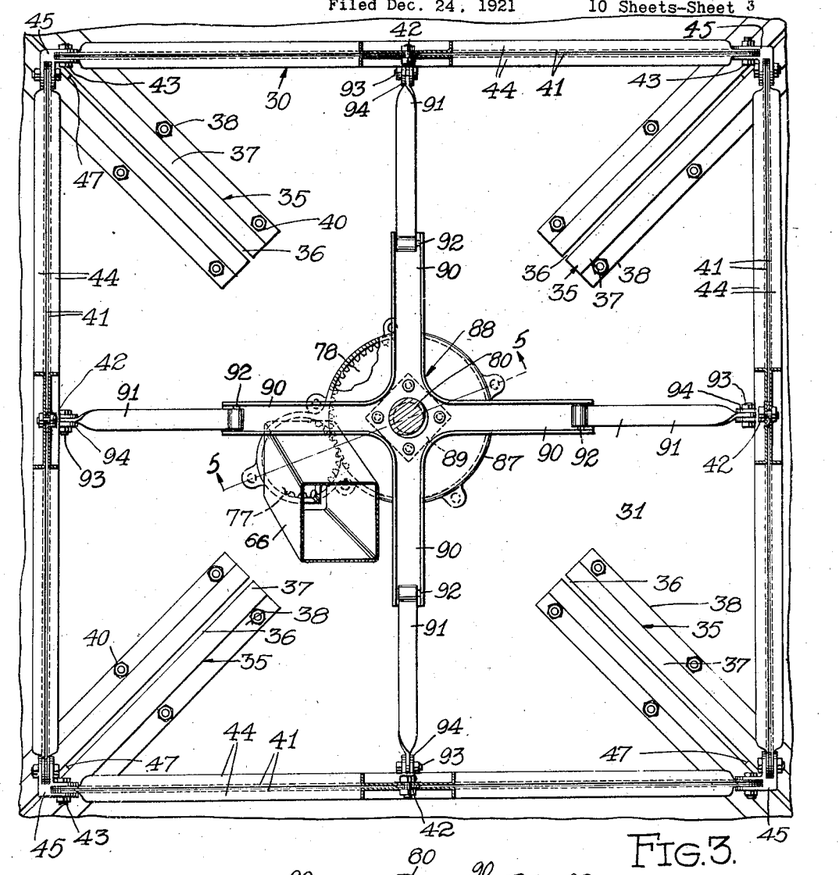
Fig. 3 is an enlarged horizontal cross-sectional view of the supporting column.

In addition to the connection between the adjacent pairs of links, the links of one column side are connected with the links of the two adjacent column sides by means of right angle corner fittings 45. These fittings (see Fig. 3) are of identical construction, and at each corner of the supporting column are arranged, one directly above the other in superposed tiers. As the supporting column is extended and retracted the corner fittings move uniformly either toward or away from each other. By thus connecting the lazy tong structures the supporting column is made a unit structure, rigid and inflexible throughout.

Both the length to width ratio and the cross sectional area of the supporting column vary in direct proportion to the extent of its longitudinal adjustment. For this reason the rolling connection between the supporting column and the supporting base, of which the rollers 39 form a part, is provided. The rollers 39, it will be noted, are mounted on axles 46 carried by extensions 47 formed, one extension on each of the respective four bottom corner fittings of the column.

Upon the top of the supporting column and movable with it during adjustment, a second platform 48 is mounted. This platform, like the base platform, is re-enforced marginally by means of down-turned flanges 49 and 50, and like the base platform, is fastened to the supporting column by means of rails and rollers. The flanges 49 and 50 extend along the outer edge and inner edge respectively of the platform, the latter defining a central opening 51 in the platform directly over which a seat 52 is supported. The manner in which the seat 52 is constructed as well as the manner in which it is supported above the platform are immaterial, though a "bucket-seat" and a rigid support therefor have been illustrated. Drawers 53, arranged to slide or open oppositely, may be provided beneath the seat as a convenience.

In order that the supporting column may move relatively to the adjustable platform 48 when the former is longitudinally extended or retracted, a rolling connection similar to that described hereinbefore is provided. Rails 54, of which there are four, are radially disposed beneath and fastened to the platform, and like the rails 35, are made sectional, the rail sections being spaced apart and arranged parallel to define guide slots 55. Within the guide slots, extensions 56, formed on the top corner fittings, are extended; each extension carrying one or more rollers which are adapted to bear against and roll along the under face of the platform in paths defined by the rails. Thus organized, the several top corner fittings are free to travel radially and laterally toward and from the longitudinal axis of the supporting column as its cross sectional area is varied by longitudinal adjustment. As a further convenience, a foot rest 57, support by brackets 58, secured to the platform, may be provided. Preferably the foot rest overhangs the edge of the platform directly in front of the seat 52.

Having described the construction of the supporting column and the manner in which the lazy tong structures extend and retract, I will next describe the operating means employed to effect such extension and retraction. Above the adjustable platform and directly in front of the seat 52 I provide an operating hand-wheel 59. To raise and lower the platform it is but necessary for the occupant of the seat 52 to rotate the wheel, and through such rotation, vary the angular relation of the total number of pairs of lazy tong links. The hand-wheel 59 is pinned as at 60 to an upright shaft 61 journalled in bearings 62 carried inside a column 63 fastened to and in turn carried by the adjustable platform. The shaft 61 at its lower end is extended through and beneath the adjustable platform, and by means of a universal coupling 64, is fastened to what I shall hereinafter designate "an extensible or telescopic connection." Such connection is designated in its entirety as 65 and is adapted to extend and retract simultaneously with and to the same extent as the supporting column 30.

Figure 4:
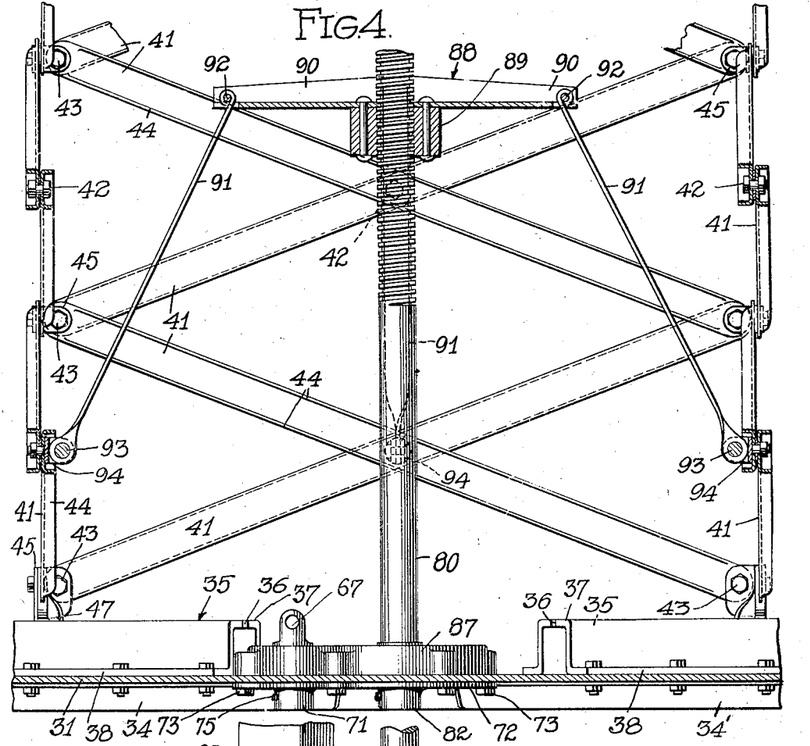
Fig. 4 is an enlarged vertical cross-sectional view of that portion of the supporting column illustrated in Fig. 3.
Figures 19, 20, 21:
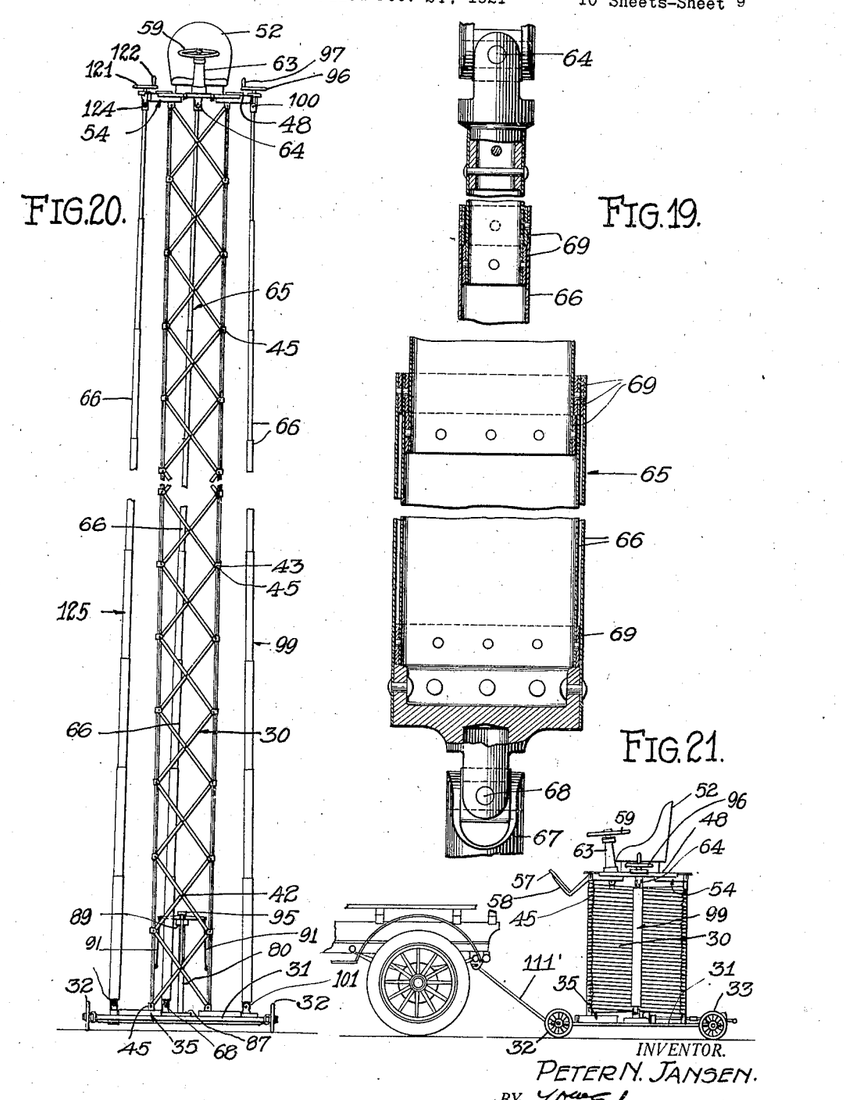
Fig. 19 is a detail vertical sectional view of one of the three extensible or telescopic connections employed in the construction of the device or support.
Fig. 20 is a diagrammatic front end elevation of the tower or support fully extended.
Fig. 21 is a similar view, in side elevation, of the tower or support fully collapsed.

As illustrated in Fig. 19 of the drawings, the extensible or telescopic connection comprises a plurality of hollow polygonal tube sections 66, each of a different size in cross section whereby, as the connection 65 is retracted, the tubes or tube sections telescope one within the other. As the topmost and smallest tube section is turned by a rotation of the hand-wheel 59, obviously a similar turning movement is imparted to each of the several progressively larger tubes, since the shape of the tubes in cross section prevents a turning movement of the one tube within the other. The bottom and largest tube section (see Fig. 4) at its lower end is fastened to a stub shaft 67 by means of a universal coupling 68 similar to the coupling 64 connecting the topmost tube section with the shaft 61. Jointly the couplings 64 and 68 take care of the resulting change in the angular relation of the connection 65 as the supporting column is extended or retracted.

To prevent a complete withdrawal of one tube section from its telescopic engagement with another tube section, stops 69 are provided within and at opposite ends of each tube section. In extending the connection 65 the tube sections slide freely one within the other in succession, the smallest tube section being the first to be withdrawn until its bottom end stop 69 engages the upper end stop 69 of the next succeedingly larger tube section, whereupon the next smallest tube section is similarly withdrawn and so on. In retracting the connection, the tube sections telescope inversely i. e., begin at the bottom of the connection and continue progressively upwardly until the topmost or smallest tube section is fully telescoped. The extensible connection, in all positions of adjustment, is completely enclosed within the confines of the supporting column.

Figure 5:
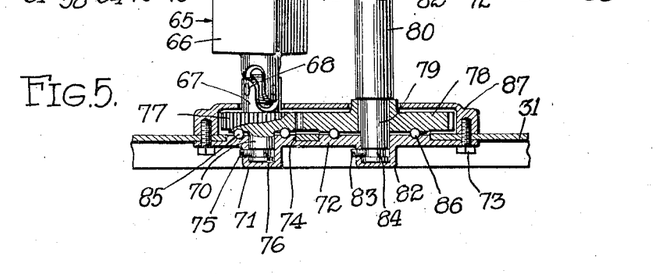
Fig. 5 is a section on the line 5—5 of Fig. 3.
Figures 6, 7:
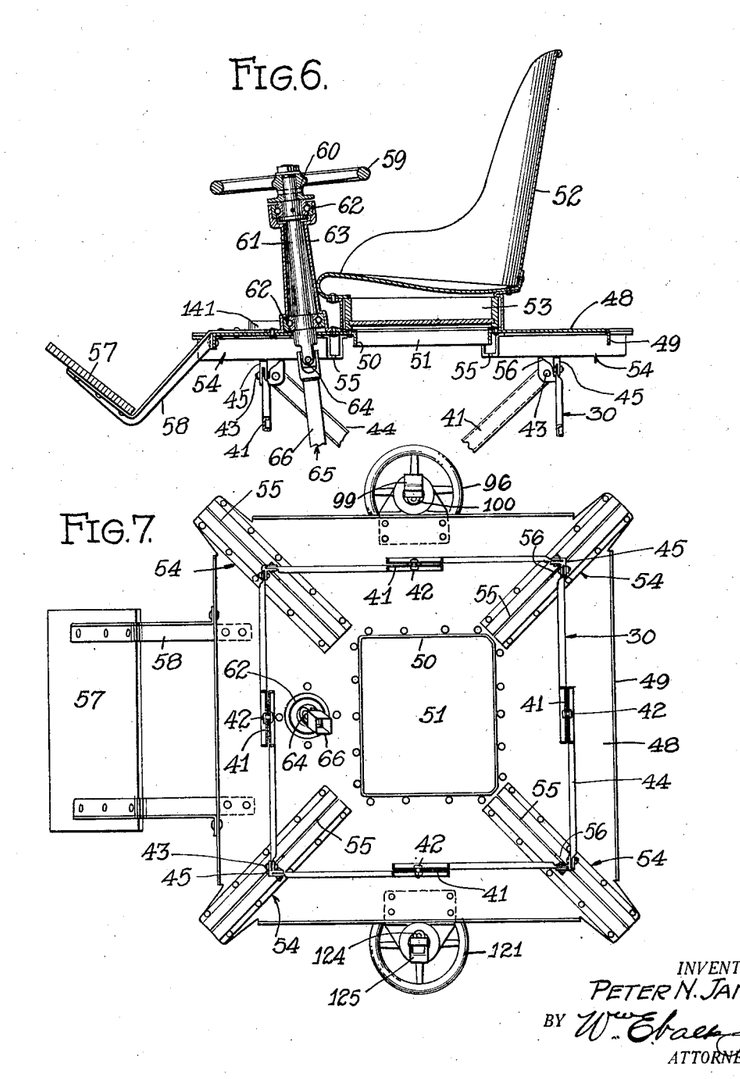
Fig. 6 is a vertical cross-sectional view of the adjustable platform and its associated structure.
Fig. 7 is an inverted plan view of the adjustable platform and its associated structure; a portion of the supporting column and other related parts being shown in section.

In Fig. 5 of the drawings the coupling between the telescopic connection and the stub-shaft as well as the stub-shaft mounting are illustrated. The stub-shaft, it will be noted, is reduced in diameter at one end, such reduced end, designated 70, fitting a depression 71 formed in a removable cover plate 72 fastened as at 73 over an opening 74 in the base platform. A set-screw 75, penetrating the wall of the depression and engaging in an annular groove 76 formed in the reduced end 70 of the stub-shaft, holds the stub-shaft 70 in place. Immediately above the cover plate, and keyed to or made integral with the stub-shaft, is a gear 77. Such gear is in mesh with a large gear 78 keyed to the reduced end 79 of an upright operating screw 80. The screw 80, like the stub-shaft 67, is held with its reduced end 79 seated in a depression 82 of the cover plate by means of a set-screw 83 penetrating the wall of the last mentioned depression and engaging in an annular groove 84. Both gears 77 and 78 are mounted on ball bearings. The bearing 85 for the gear 77 is interposed between the bottom face of the gear and the top face of the cover plate as is also the bearing 86 for the gear 78. Since both gears are held against axial displacement, obviously the weight of each gear, as well as the weight of the extensible connection on the one hand, and the operating screw on the other, are borne by the bearings 85 and 86 respectively. A gear case 87 is provided within which both gears 77 and 78 are enclosed.

The vertical screw 80 is concentrically mounted with respect to the supporting column. At its upper end it carries an adjustable spider 88 having a hub portion 89 threaded to receive the threaded upper end of the operating screw. The arms 90 of the spider extend out radially from the hub, inside the column, and are preferably of channel section. The number of arms should correspond exactly with the number of sides there are to the column, as each arm, at its free end, is connected by a link 91 with the particular column side toward which such arm extends. The links 91 are of uniform length and are pivotally connected at one end to the arms 90 and at their opposite ends are pivotally connected to the bottom pair of crossed links 41 at their point or points of intersection. The pivotal connections between the links and arms are designated as 92 and the pivotal connections between the links and column sides are designated as 93. A special fitting 94 is provided that the latter connection may be made. Preferably the links 91 extend outwardly and downwardly from the arms 90, and except when the supporting column is completely collapsed, are always under tension. It should be noted also that the four links 91 constitute the only connection between the operating screw and the supporting column.

In operation, when it is desired to either raise or lower the platform 48, the occupant of the seat 52 can, by rotating the hand-wheel 59, effect the desired adjustment. To raise the platform the wheel 59 is rotated clockwise. From the wheel 59 power is transmitted through the telescopic connection 65 to the gear 77, and from the gear 77, to the operating screw 80 by way of the gear 78. As the operating screw 80 is turned the spider 88 moves upwardly or away from the base platform 31. In moving thus, the spider 88 exerts a steady uniform pull on the four lazy tong structures at the points of intersection of the four bottom pairs of crossed lazy tong links, and since all of the several pairs of lazy tong links are pivotally connected together, obviously the four sides of the supporting column will be simultaneously extended. As the supporting column is extended the platform 48 is raised to the same extent.

Simultaneously with the extension of the supporting column, the bottom corner fittings and the top corner fittings move inwardly, such movement being guided at all times by the rails 35 and 54. Movement of the spider in an upward direction can be continued by rotating the wheel 59 until automatically stopped by its engagement with a stop 95 formed on the upper end of the screw. When thus engaged a continued rotation of the wheel in a clockwise direction is prevented.

The extent of adjustment accorded the platform 48 is several times the extent of adjustment accorded the spider 88; the difference of course depending upon the number of pairs of lazy tong links employed in the construction of the column sides. If thirty pairs of lazy tong links are provided for each column side and the bottom pair of lazy tong links are extended one inch, then it follows that the extent of adjustment accorded the platform 48 is thirty times one or thirty inches, or, in other words, thirty times as great as the extent of adjustment accorded the spider 88. In lowering the platform and in retracting the column a corresponding ratio of movement between the column and the spider exists. Moreover, in view of the mechanism employed, the supporting column, regardless of its position of adjustment, is automatically locked against continued movement in either direction, and can only be adjusted through a rotation of the hand-wheel 59.

Figure 8:
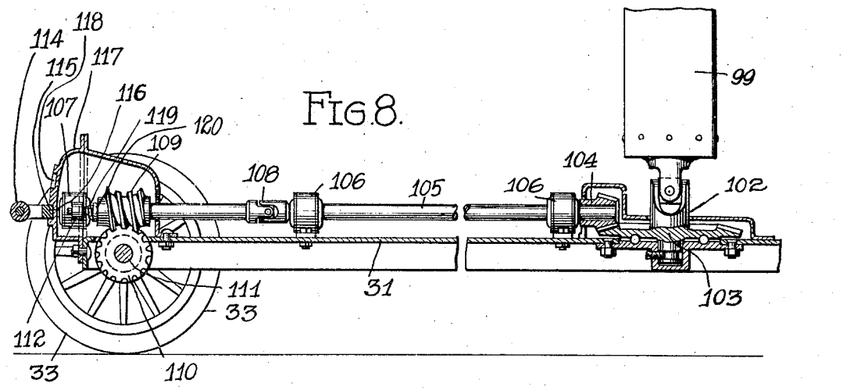
Fig. 8 is a detail view, partly in section and partly in elevation, of the driving connection between the power shaft and the rear or driving wheels.
Figures 9, 10:
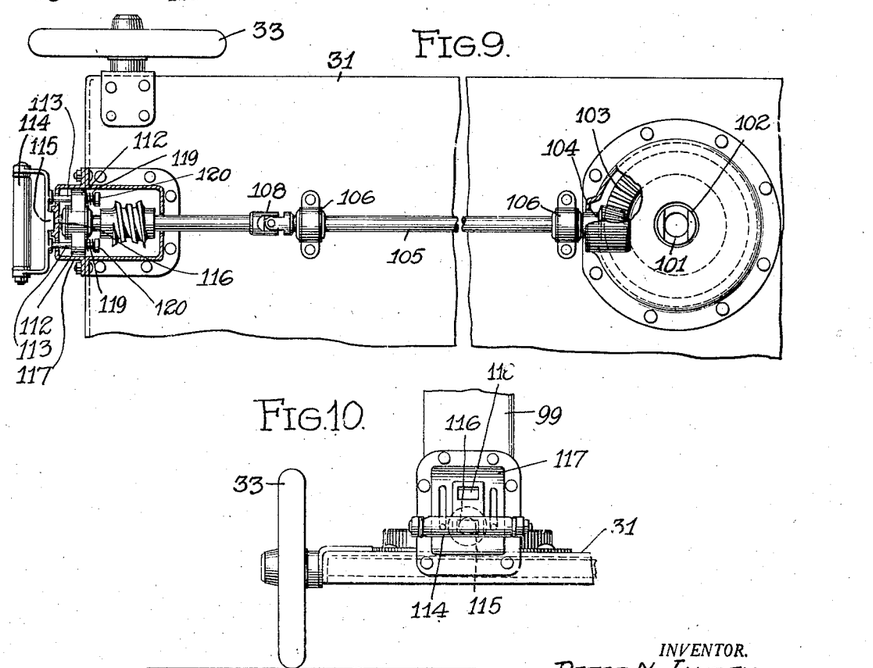
Fig. 9 is a plan view of the mechanism illustrated in Fig. 8.
Fig. 10 is a detail end elevation of the lock mechanism forming a part of the driving connection.

In referring to Figs. 8 to 10 inclusive, wherein the propelling mechanism is illustrated, it will be noted that power is applied to the rear or driving wheels 33—33 only. To the left of the seat 52 and within convenient reach of the occupant thereof I provide an operating hand-wheel 96 having an upstanding grip 97 fastened to its rim. The wheel 96 is mounted on a shaft 98 journalled in bearings (not shown) carried by the platform 48. At its lower end the shaft 98 extends through and beneath the platform at one side of the supporting column 30. An extensible or telescopic connection 99 fastened to the lower shaft end by means of a universal coupling 100 constitutes a part of the propelling power transmission mechanism. Such telescopic connection is a counterpart of the telescopic connection 65 hereinbefore described in detail. At its lower end it is coupled as at 101 to a stub-shaft 102 held in place and supported vertically above the base platform 31 in much the same manner as is the stub-shaft 67. A bevel gear 103 is keyed to the stub-shaft 102 and is in mesh with a bevel pinion 104 mounted at one end of a divided shaft 105 journalled in suitable bearings. The bearings for one shaft section are fixed and designated as 106 whereas the bearing for the other shaft section is movable and is designated as 107. A universal coupling 108 joins the two shaft sections together.

In providing a movable bearing 107 movement of one shaft section relatively to the other shaft section is permitted. The movable shaft section, at its outer end, carries a worm 109 normally in mesh with a gear 110 keyed or otherwise fastened to the rear or driving axle 111 upon which the driving wheels 33—33 of the support are mounted. When thus connected power is transmitted by way of the extensible connection 99 through the gears 103 and 104 to the divided shaft 105, and from the shaft 105, via the worm 109 and gear 110, to the rear axle. The power, however, regardless of the position of adjustment of the platform 48, is at all times obtained through a rotation of the hand-wheel 96, and, since the relation of the hand-wheel 96 to the seat 52 is invariable, obviously the propulsion of the device or support is always under the direct manual control of the occupant.

The above described means of propulsion is such that the occupant of the device can control the power means under all circumstances. When in use as a substitute for the scaffold it is intended that the movements of the device shall be so controlled. In transporting the device from place to place when not in use however a different method of propulsion can be adopted. If desired, the device of support can be suitably coupled up with another vehicle and towed. To this end a tongue 111' is provided. When being towed, naturally it is desirable that the driving connection between the hand-wheel 96 and the rear axle 111 shall be rendered ineffectual. For this reason the shaft bearing 107 is made movable. At each side of the bearing proper projections 112 are formed. Through these projections rods 113 are freely slidable. The rods 113, at one end, jointly carry a handle 114 having a lug 115 formed upon it. Normally the lug 115 engages in a notch 116 so formed in a suitable housing 117 that the bearing 107, as well as the movable shaft section, are firmly held in place. Above the notch 116 a second notch 118 is formed in the housing 117. When it is desired to break the driving connection between the worm 109 and the gear 110, the handle 114 is withdrawn until the lug 115 is removed from locking engagement with the lower notch. When withdrawn, it is raised bodily until the worm 109 and the gear 110 are fully disengaged. Upon releasing the handle in its raised position the lug 115 enters the upper notch 118. Thus positioned the driving connection is effectually broken. Springs 119, mounted on the rods 113, and bearing respectively against the projections 112 and against enlargements 120 formed on the rod ends, at all times urge the handle 114 inwardly to automatically seat the lug 115 within one or the other of the notches.

Figure 1:
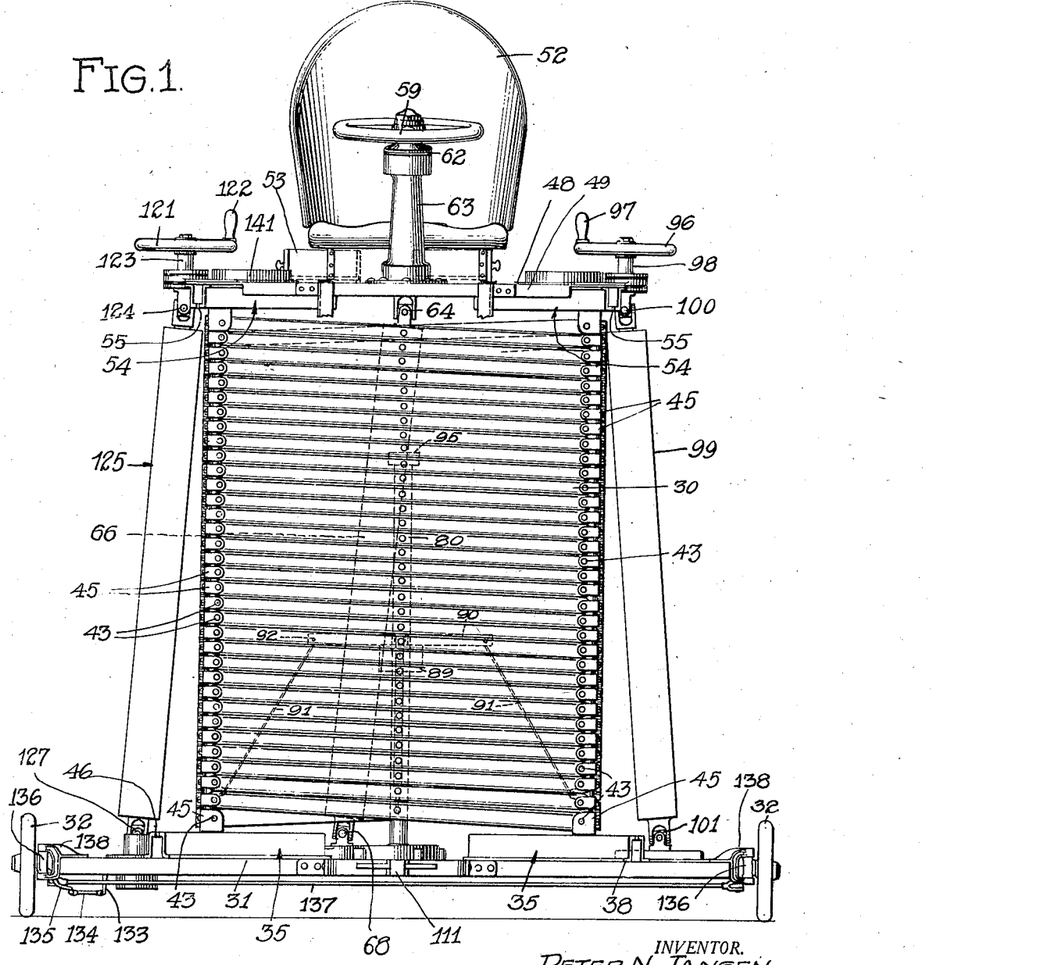
Fig. 1 is a front elevation of the vehicular extension tower or support fully collapsed.
Figure 2:
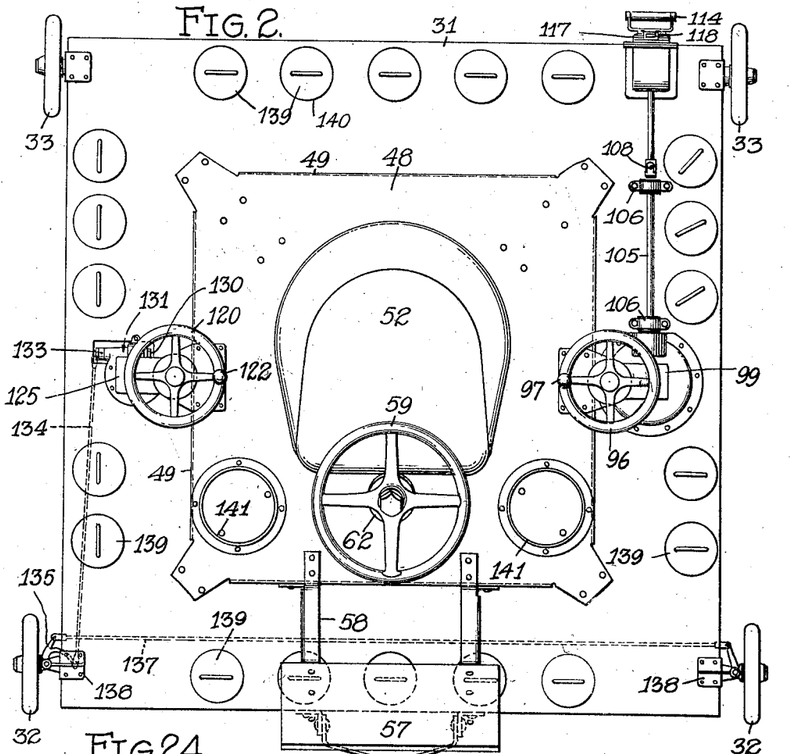
Fig. 2 is a plan view of the device or apparatus as illustrated in Fig. 1.

The steering mechanism, which I will next describe, is in many respects generally similar to the propelling mechanism. On the opposite side of the seat 52 from the handwheel 96, a third hand-wheel 121 is provided. Like the hand-wheel 96, the hand-wheel 121 has an upstanding grip 122 secured to its rim. By referring to Fig. 1 of the drawings it will be noted that the hand-wheel 121 is mounted on a vertical shaft 123 journalled in suitable bearings in turn mounted on and movable with the adjustable platform. The shaft 123 at its lower end is extended beneath the adjustable platform and is connected by means of a universal coupling 124 with an extensible or telescopic connection 125. The connection 125 and the connection 99 are identical, and both, in all positions of adjustment of the platform, are slightly inclined to the vertical. At its lower end the connection 125 is fastened to a vertically disposed stub-shaft 126 by means of a universal coupling 127. The couplings 124 and 127 and the couplings 100 and 101 take care of such slight variation in the angular relation of the connections 125 and 99 as occurs when the connections are either extended or retracted.

Figure 11:
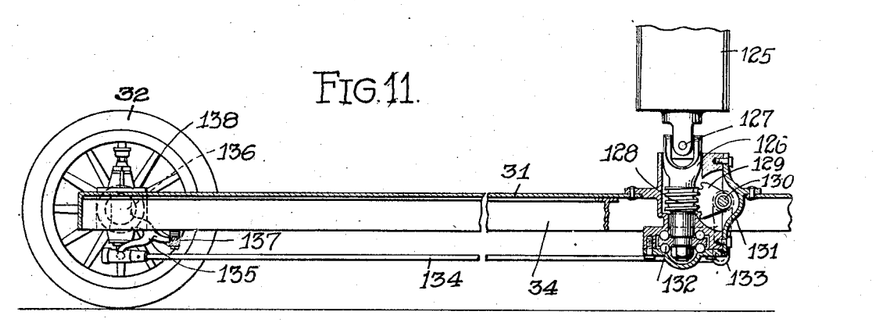
Fig. 11 is a view similar to Fig. 8 showing the connection between the steering column connection and the front or steering wheels.
Figures 12, 13:
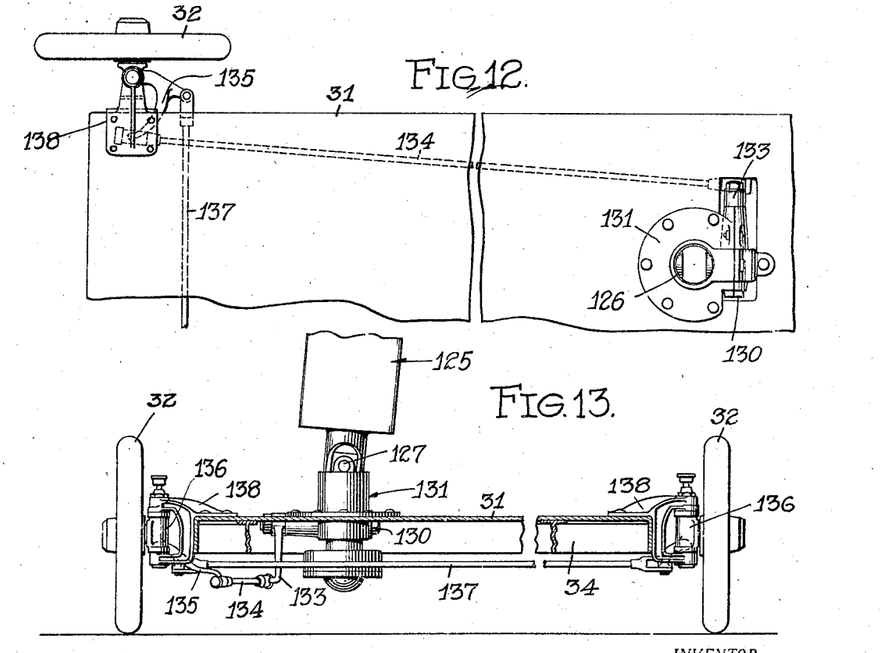
Fig. 12 is a plan view of the steering mechanism illustrated in Fig. 11.
Fig. 13 is a view at right angles to the part sectional view of Fig. 11 showing the front wheel mounting and cross connection.
Figure 14:
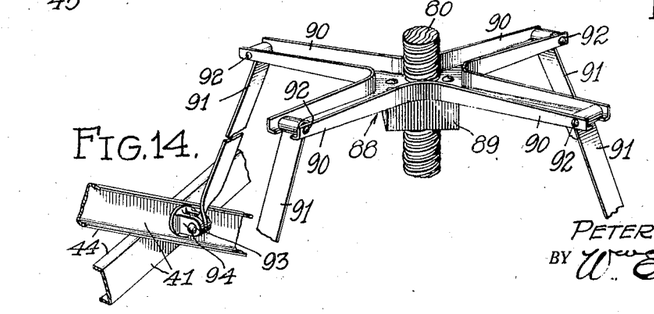
Fig. 14 is a detail perspective view of the spider forming a part of the supporting column adjusting mechanism.
Figures 15, 16, 17, 18:
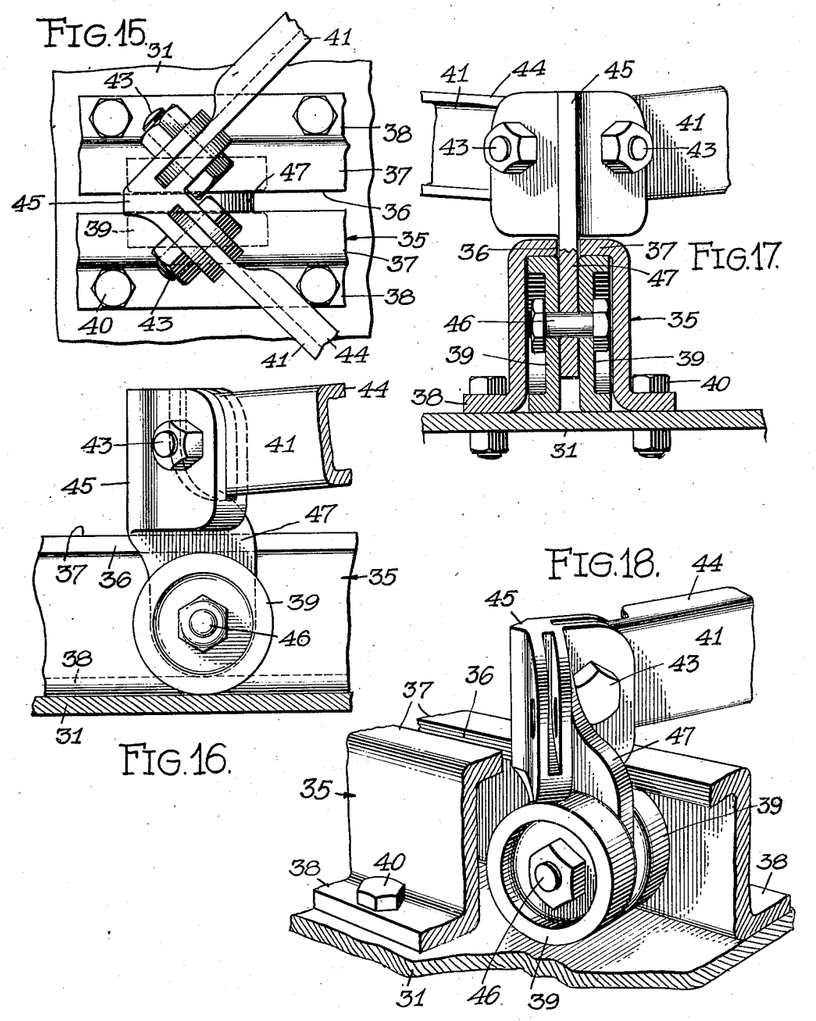
Fig. 15 is a detail view of the rolling connection between one of the corner fittings of the supporting column and its associated guide.
Fig. 16 is a detail view, from the side, of the connection illustrated in Fig. 15.
Fig. 17 is a transverse vertical sectional view of one of the guide rails showing its relation to one of the corner fittings.
Fig. 18 is a perspective view, with a portion of one of guide rails broken away, further illustrating the connection shown in Fig. 15.

Intermediately of its ends the stub-shaft 126 is provided with a worm 128. The worm (see Fig. 11) is in mesh with a gear segment 129 mounted on a shaft 130 suitably journalled in a housing 131 within which the stub-shaft 126, the worm 128, the gear segment 129 and the shaft 130 are all enclosed. The housing, which may be made in two or more parts, is adapted to fit an opening 131 formed in the base platform 31 and is fastened to the platform and within the opening as indicated. Bearings 132 for the stub-shaft are also enclosed in the housing. The shaft 130, at its outer end, is provided with an arm 133, connected by means of a rod 134, with an arm 135 forming a part of one of the steering knuckles 136 upon which the front or steering wheels 32—32 of the support are mounted. A rod 137 uniting both steering knuckles 136 completes the steering connection. Preferably the steering knuckles 136 are of more or less conventional form and are mounted within suitable brackets 138 fastened, one on either side of the base platform.

In the operation of the steering mechanism a procedure somewhat similar to the procedure outlined in describing the operation of the propelling mechanism is followed. In moving the hand-wheel 121, the power thus applied is transmitted to the worm 128 thru the extensible connection 125. From the worm 128 motion is transmitted to the gear segment 129, and from the gear segment, by way of the shaft 130, arm 133, rod 134 and arm 135, to the steering knuckle 136 upon which the right hand steering wheel 34 is mounted. Both wheels 34 being connected as at 137, obviously the movements imparted to the one are simultaneously imparted to the other. The extensible or telescopic connection 125 renders the steering mechanism operable regardless of the position of adjustment of the platform.

A device or support constructed as herein set forth is not only capable of adjustment, but in addition is capable of being propelled and steered. The occupant of the seat 52 can, without assistance, control the propulsion of the device, and can, without assistance, steer it in all directions from his elevated position above the platform 48. The hand-wheel 59, by means of which the adjustment of the platform is regulated, it will be noted, is disposed directly in front of the occupant of the seat whereby such occupant, in rotating the wheel, may use both hands. The hand-wheels 96 and 121 for propelling and steering the device respectively are also under the direct control of the occupant of the seat 52. The power required to be expended in rotating these two hand-wheels, being considerably less than the power required to be expended in rotating the hand-wheel 59, may be obtained through the use of the right and left hands respectively. By using both hands at the same time the occupant of the seat can both steer and propel the device simultaneously. If desired, and as an added factor of safety, weights 139 may be disposed along the edges of the base platform, each weight fitting a depression 140 provided for this purpose. Also, if desired, containers 141 may be fastened to the adjustable platform 48 for the reception of paint buckets or other tools or applicances in use by the occupant of the device.

Figures 22, 23:
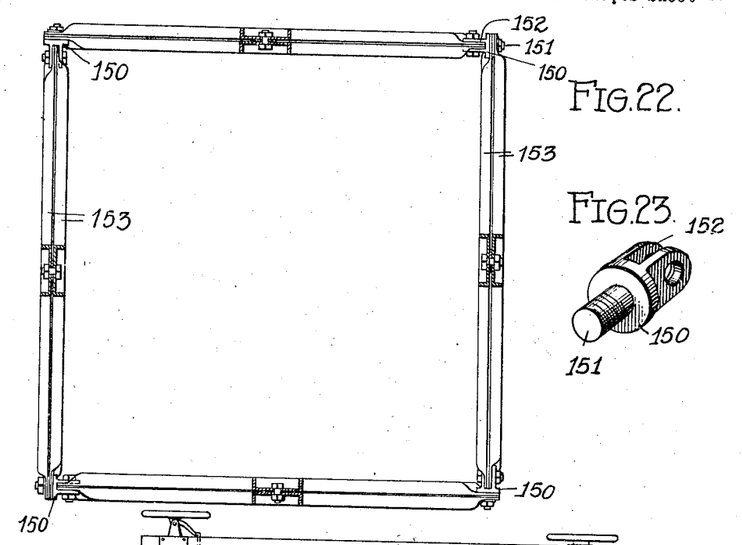
Fig. 22 is a sectional view of the column illustrating a modified form of corner fitting.
Fig. 23 is a detail perspective view of one of the corner fittings illustrated in Fig. 22.

In the modification of Figs. 22 and 23 a somewhat different type of corner fitting is disclosed. Instead of a right angle fitting such as I have disclosed in the preferred form of the device, a fitting comprising a head portion 150 and a shank portion 151 is provided. The head portion 150 is bifurcated as at 152 to receive the ends of such adjacent lazy tong links 153 as are employed in the construction of one of the column sides, whereas the shank portion 151 constitutes the pivot pin by means of which the ends of adjacent lazy tong links of the connected column side are fastened together and to the links fitting the bifurcation. Thus constructed, the links 153 of each column side engage at one end in the bifurcations of the corner fittings and at their opposite end engage the shank portions of such fittings.

Figure 24:
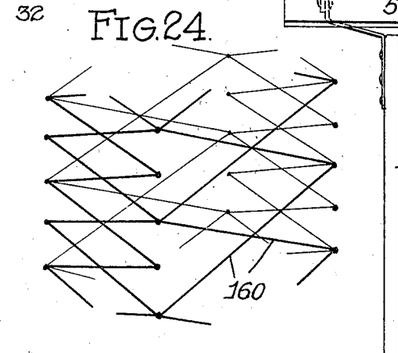
Fig. 24 is a diagrammatic perspective view of a modified form of supporting column.

In the modification of Fig. 24 a form of supporting column is illustrated in which a rectangular adjustable platform as distinguished from a square adjustable platform is provided. The supporting column, instead of comprising four column sides of equal dimension, includes four sides, two of which are twice as large as the remaining two. Such an arrangement is made possible by the use of lazy tong links 160 in the construction of two of the column sides which are twice as long as the links comprised in the two remaining sides. The ends of the longer links however, instead of being fastened to each pair of shorter links at the corners of the column, are fastened to alternate pairs of links. In other words, the number of links required in the construction of the column sides of large dimension are exactly one half the number required in the construction of the column sides of small dimension.

Figure 25:
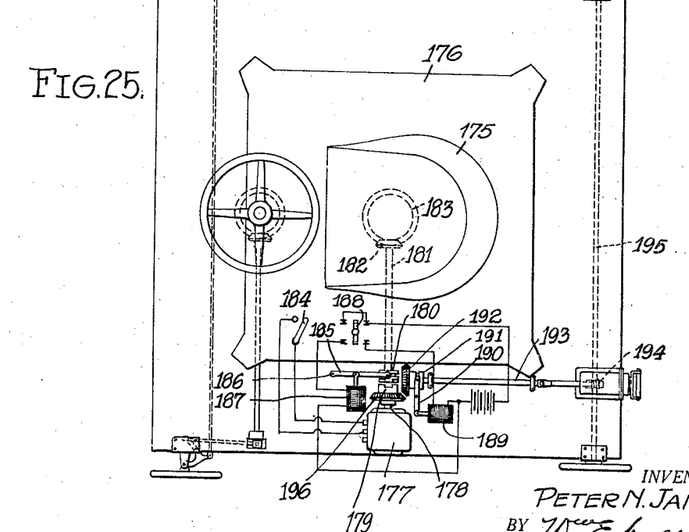
Fig. 25 is a semi-diagrammatic view, in plan, illustrating as a modification, an electrically operated device.
Figure 26:
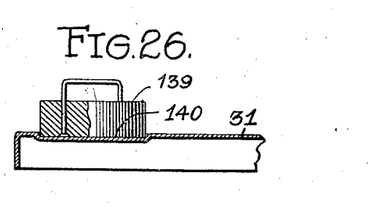
Fig. 26 is a fragmentary sectional view illustrating the mounting for one of the base platform weights.

Should an electrically operated device be preferred to a manually operated device, the modified structure illustrated in Fig. 25 can be substituted. In an electrically operated structure but one hand control wheel is required. Obviously it is entirely impractical to steer the device electrically. As in the preferred form of the device the seat for the occupant, designated as 175, is supported above an adjustable platform 176, and the platform is in turn carried by an extensible supporting column (not shown). A wheeled base platform is also provided as a support for the extensible upright supporting column. At one side of the base platform, and directly supported thereon I provide an electric motor 177 of a construction such that it can be readily reversed. The motor 177 is provided with a shaft 178 having its outer face constructed in the form of a suitable clutch member 179. A cooperating clutch member 180, mounted on a shaft 181 is adapted to be moved into and out of locking engagement with the clutch member 179. The shaft 181 extends inwardly from the motor and carries on its inner end a bevel gear 182 which is adapted to mesh at all times with a correspondingly beveled gear 183 keyed or otherwise suitably fastened to an upright vertical screw (not shown) similar to the screw 80 of the preferred form of device. When the shafts 178 and 181 are coupled together through the agency of the clutch, obviously the operating screw by means of which the column is extended and retracted is rotated. The operation of the motor is controlled by means of a switch 184 movable with the adjustable platform and disposed in convenient proximity to the seat.

The clutch operating mechanism comprises a lever 185 pivoted at one end as at 186, a solenoid 187 and a knife-switch 188. The latter is preferably of the two-way type and is operable to either close the circuit of which the solenoid forms a part or is operable to close a second circuit of which a second solenoid 189 forms a part. As the circuit of which the first mentioned solenoid forms a part is closed the pivoted lever 185 is moved, such movement imparting a corresponding movement to the clutch member 180 to establish the desired driving connection between the motor shaft 178 and the driving shaft 181. The solenoid 189 is so related to a pivoted lever 190 that the former, when energized, actuates the lever. The lever, it will be noted, is in engagement at one end with a sliding sleeve 191 formed integrally with a gear 192 also slidably mounted on and keyed to a shaft 193. Said shaft 193 is mounted directly above the base platform and extends at right angles to the shaft 181. Its function is that of a drive shaft for the device for propulsion purposes in view of its connection as at 194 with the rear axle 195. The movement of the sliding gear 192 into and out of mesh with a gear 196 mounted on the motor shaft enables the occupant of the seat to make and break the driving connection between the motor and the shaft 181 through movement of the knife-switch 188. At its outer end the shaft 181 may be provided with suitable mechanism for breaking the driving connection between it and the rear axle. In all other respects the electrically operated device of Fig. 25 is generally similar to the preferred form of device except that the steering wheel is mounted directly in front of the seat rather than to one side.

While I have described my invention in detail in its present preferred embodiment, it will be obvious to those skilled in the art after understanding my invention, that various changes and modifications may be made therein without departing from the spirit or scope thereof, I aim in the appended claims to cover all such modifications and changes.

What is claimed is:—

1. In a device of the character described, the combination, of a supporting base, a running gear therebeneath, a platform movable vertically relatively to the supporting base, means operable from the platform to effect its vertical adjustment, and means operable from said platform in any position of adjustment for steering and propelling said device, said means being extensible and retractable in direct proportion to the adjustment accorded said platform.

2. In a device of the character described, the combination, of a supporting base, a running gear therebeneath, a platform movable vertical relatively to the supporting base, means operable from said platform to effect its vertical adjustment, and means likewise operable from said platform in any position of adjustment for steering and propelling said device, said adjusting means and said last mentioned means being separately extensible and retractable in direct proportion to the adjustment accorded said platform.

3. In a device of the character described, the combination, of a supporting base having a running gear therebeneath, an upright extensible supporting column mounted on the supporting base, a platform carried by the supporting column and movable vertically relatively to the supporting base as the supporting column is extended or retracted, means operable from the platform, regardless of its position of adjustment, to extend and retract the supporting column, and mechanism operatively connected with the running gear and likewise operable from the platform, regardless of its position of adjustment, to propel the device as a unit, said operating mechanism for propelling the device being extensible with the supporting column during adjustment.

4. In a device of the character described, the combination, of a supporting base having a running gear therebeneath, an upright extensible supporting column mounted on the supporting base, a platform carried by the supporting column and movable relatively to the supporting base as the supporting column is extended or retracted, means operable from the platform, regardless of its position of adjustment, to extend and retract the supporting column, and mechanism operatively connected with the running gear, and likewise operable from the platform, regardless of its position of adjustment, to steer the device as a unit, said operating mechanism for steering the device being extensible with the supporting column during adjustment.

5. In a device of the character described, the combination, of a supporting base having a running gear therebeneath, an upright extensible supporting column mounted on the supporting base, a platform carried by the supporting column and movable relatively to the supporting base as the supporting column is extended or retracted, mechanism operable from the platform, regardless of its position of adjustment, to extend and retract the supporting column, mechanism operatively connected with the running gear and likewise operable from the platform, regardless of its position of adjustment, to propel the device as a unit, and mechanism operatively connected with the running gear and likewise operable from the platform, regardless of its position of adjustment, to steer the device as a unit, said operating mechanism for propelling the device and said operating mechanism for steering the device being extensible with the supporting column during adjustment.

6. In a device of the character described, the combination, of a supporting base having a running gear therebeneath, a platform mounted above the supporting base, means for raising and lowering the platform relatively to the supporting base, a source of power, the source of power being controllable from the platform regardless of its position of adjustment, and an extensible and retractable connection between the controlling means and the running gear.

7. In a device of the character described, the combination, of a supporting base having a running gear therebeneath, a platform mounted upon the supporting base, means for raising and lowering the platform, a source of power, the source of power being controllable from the platform regardless of its position of adjustment to both propel and steer the device as a unit, and extensible and retractable connections between the controlling means and the running gear.

8. In a device of the character described, the combination, of a supporting base having a running gear therebeneath, an upright extensible supporting column mounted on the supporting base and comprising three or more lazy tong structures fastened together at the respective three or more corners of the supporting column, a platform carried by the supporting column and movable vertically relatively to the supporting base as the connected lazy tong structures are extended and retracted, means operable from the platform, regardless of its position of adjustment, to extend and retract the supporting column by varying the angular relation of the links comprised in the several lazy tong structures, mechanism operatively connected with the running gear and operable from the platform, regardless of its position of adjustment, to propel the device as a unit, and mechanism operatively connected with the running gear and likewise operable from the platform, regardless of its position of adjustment, to steer the device as a unit, said mechanism for propelling the device and said mechanism for steering the device as well as the mechanism for raising and lowering the supporting column being of a construction such that each of said mechanisms may be independently extended and retracted as and according to the platform adjustment.

9. In a device of the character described, the combination, of a supporting base having a running gear therebeneath, an upright extensible supporting column mounted on the supporting base, a platform carried by the supporting column and movable vertically relatively to the supporting base as the supporting column is extended and retracted, means operable from the platform, regardless of its position of adjustment, to extend and retract the supporting column, and mechanism telescopically connected with the running gear and operable from the platform, regardless of its position of adjustment, to propel the device as a unit, said telescopic connection being extensible and retractable in direct proportion to the adjustment accorded said platform.

10. In a device of the character described, the combination, of a supporting base having a running gear therebeneath, an upright extensible supporting column mounted on the supporting base, a platform carried by the supporting column and movable vertically relatively to the supporting base as the supporting column is extended and retracted, means operable from the platform, regardless of its position of adjustment, to extend and retract the supporting column, and mechanism telescopically connected with the running gear, and likewise operable from the platform, regardless of its position of adjustment, to steer the device as a unit, said telescopic connection being extensible and retractable in direct proportion to the adjustment accorded said platform.

11. In a device of the character described, the combination, of a supporting base having a running gear therebeneath, a platform adjustable vertically relatively to the supporting base, means for adjusting said platform, mechanism operatively connected with the running gear and operable from the platform, regardless of its position of adjustment, to propel the device as a unit, and mechanism operatively connected with the running gear and likewise operable from the platform, regardless of its position of adjustment, to steer the device as a unit, said mechanism for propelling the device and said mechanism for steering the device being freely extensible and retractable in direct proportion to the adjustment accorded said platform.

12. In a device of the character described, the combination, of a supporting base having a running gear therebeneath, a platform adjustable vertically relatively to the supporting base, means for raising and lowering the platform, mechanism positioned at one side of the platform and operatively connected with the running gear for propelling the device as a unit, said mechanism being freely extensible and retractable as the platform is vertically adjusted, and mechanism operatively connected with the running gear and positioned at the opposite side of the platform for propelling the device as a unit, said last mentioned mechanism being likewise freely extensible and retractable as the platform is vertically adjusted.

13. In a device of the character described, the combination, of a supporting base having a running gear therebeneath, a supporting column mounted on the supporting base and comprising three or more connected lazy tong structures arranged to define an open space therebeneath, a platform carried jointly by the three or more lazy tong structures and movable vertically relatively to the supporting base as the supporting column is extended or retracted, means operable from the platform, regardless of its position of adjustment, to extend or retract the supporting column, said means including an extensible connection wholly enclosed within the confines of the supporting column and so mounted at the base thereof as to distribute the force necessary to extend the column uniformly over the lazy tong structures comprising the column sides, means operable from the platform, regardless of its position of adjustment, to propel the device as a unit, said last mentioned means being operably connected with the running gear, an extensible connection incorporated in the propelling means of a construction such that is adapted to extend and retract simultaneously with the adjustment accorded the supporting column, and means likewise operable from the platform, regardless of its position of adjustment, to steer the device during propulsion, said last mentioned means being also connected with the running gear and also comprising an extensible connection which is adapted to automatically adjust itself according to the column adjustment.

14. In a device of the character described, a wheeled supporting base, a supporting column mounted upon the supporting base, said supporting column being vertically extensible, a platform carried by the supporting column, operating mechanism for extending the column controllable from the platform and enclosed wholly within the confines of said column, operating mechanism for propelling the device as a unit controllable from the platform, said operating means including an extensible connection positioned at one side of the column, and operating means for steering the device as a unit, said last mentioned operating means being positioned at the opposite side of the supporting column and extensible therewith, together with a seat mounted upon the adjustable platform in such proximity to the means for extending the column, the means for propelling the device and the means for steering the device as to admit of the operation of any or all of said means by the occupant of said seat.

15. In a device of the character described, the combination of a supporting base mounted on wheels, a platform adjustable vertically relatively to the supporting base, a supporting column for the platform, means controllable from the platform for extending the column, means controllable from the platform for propelling the device, said last mentioned means including a driving connection for one or more of the supporting wheels, means controllable from the platform for steering the device, said means being likewise operatively connected with one or more of the wheels of the supporting base, and means incorporated in the mechanism for propelling the device for breaking the driving connection with the driving wheels.

16. In a device of the character described, a supporting base, a running gear therebeneath comprising driving wheels and steering wheels, a platform carried by and adjustable vertically relatively to said supporting base, means operable from said platform to effect its vertical adjustment, separate means also operable from said platform and connected with the driving wheels for propelling said device, and further means likewise operable from said platform and connected with the steering wheels for steering said device.

17. In a device of the character described, a supporting base, a running gear therebeneath comprising driving wheels and steering wheels, a platform carried by and adjustable vertically relatively to said supporting base, means operable from said platform to effect its vertical adjustment, separate means also operable from said platform and connected with the driving wheels for propelling said device, and further means likewise operable from said platform and connected with the steering wheels for steering said device, both said driving means and said steering means being extensible and retractable in direct proportion to the adjustment accorded said platform.

18. In a device of the character described, a supporting base, a running gear therebeneath including driving wheels, a platform carried by and adjustable vertically relatively to said supporting base, means operable from said platform to effect its vertical adjustment, separate means also operable from said platform and connected with the driving wheels for propelling said device, and means operable to render the driving means ineffectual through a break in the driving connection.

19. In a device of the character described, a supporting base, a running gear therebeneath comprising driving wheels and steering wheels, a platform carried by and adjustable vertically relatively to said supporting base, a seat for an occupant mounted upon and movable with said platform, means within reach of the occupant of the seat for effecting the vertical adjustment of said platform, separate means likewise within reach of the occupant of said seat and connected with the driving wheels for propelling said device, and further means also within reach of the occupant of said seat and connected with the steering wheels for steering said device, the adjusting means, the propelling means, and the steering means in each instance being extensible and retractable in direct proportion to the adjustment accorded said platform.

20. In a device of the character described, a supporting base, a running gear therebeneath comprising driving wheels and steering wheels, a supporting column mounted upon the supporting base, a platform carried by the supporting column and movable vertically relatively to the supporting base by extending and retracting said supporting column, means extended through the supporting column and movable from said platform to effect its vertical adjustment, separate means also operable from said platform and connected with the driving wheels for propelling said device, and further means likewise operable from said platform and connected with the steering wheels for steering said device, the connection between the steering means and steering wheels and the connection between the driving means and the driving whels being in each instance wholly disposed without the confines of said supporting column.

In testimony whereof I hereunto affix my signature.

PETER N. JANSEN.